United States Patent [19]

Bowen

[11] Patent Number: 4,735,477
[45] Date of Patent: Apr. 5, 1988

[54] FIBER OPTIC SPLICE TERMINAL AND METHOD OF USING SAME

[75] Inventor: Terry P. Bowen, Etters, Pa.

[73] Assignee: AMP Incorporated, Harrisburg, Pa.

[21] Appl. No.: 680,434

[22] Filed: Dec. 11, 1984

[51] Int. Cl.[4] .................................................. G02B 6/26
[52] U.S. Cl. ............................ 350/96.15; 350/96.20; 350/96.21; 350/320
[58] Field of Search ...... 350/96.18, 96.20, 96.21, 96.22, 350/320, 96.15, 96.16; 250/227; 264/1.5, 1.9, 2.2, 2.3, 2.5

[56] References Cited

U.S. PATENT DOCUMENTS

| | | | |
|---|---|---|---|
| 3,883,223 | 5/1975 | Hudson | 350/96 C |
| 4,102,579 | 7/1978 | Stewart | 350/96.20 X |
| 4,119,362 | 10/1978 | Holzman | 350/96.18 |
| 4,136,566 | 1/1979 | Christensen | 73/356 |
| 4,167,303 | 9/1979 | Bowen et al. | 350/96.21 |
| 4,249,794 | 2/1981 | Haley | 350/96.20 |
| 4,261,638 | 4/1981 | Wagner | 350/96.20 |
| 4,274,705 | 6/1981 | Miller | 350/96.15 |
| 4,329,017 | 5/1982 | Kapany et al. | 350/96.15 |
| 4,415,232 | 11/1983 | Caron | 350/96.21 |
| 4,420,219 | 12/1983 | Muchel | 350/96.18 |
| 4,421,383 | 12/1983 | Carlsen | 350/96.21 |
| 4,422,714 | 12/1983 | Benoit et al. | 350/96.15 |
| 4,441,784 | 4/1984 | Korth | 350/96.15 |
| 4,473,272 | 9/1984 | Johnson | 350/96.21 |
| 4,477,146 | 10/1984 | Bowen et al. | 350/96.21 |
| 4,479,697 | 10/1984 | Kapany et al. | 350/96.18 |
| 4,502,754 | 3/1985 | Kawa | 350/96.20 |
| 4,629,284 | 12/1986 | Malavieille | 350/96.21 |
| 4,699,453 | 10/1987 | Roberts | 350/96.20 |

FOREIGN PATENT DOCUMENTS

| | | |
|---|---|---|
| 95281 | 11/1983 | European Pat. Off. . |
| 96615 | 12/1983 | European Pat. Off. . |
| 105597 | 4/1984 | European Pat. Off. . |
| 2520515 | 7/1983 | France . |
| 53-75947 | 7/1978 | Japan ............... 350/96.20 |
| 56-102817 | 8/1981 | Japan ............... 350/96.20 |
| 57-78010 | 5/1982 | Japan ............... 350/96.20 |
| 57-85015 | 5/1982 | Japan ............... 350/96.20 |
| 55-149293 | 5/1982 | Japan . |
| 56-147454 | 3/1983 | Japan . |
| 58-171012 | 10/1983 | Japan ............... 350/96.20 |

OTHER PUBLICATIONS

IBM Technical Disclosure Bulletin vol. 22, No. 2, Jul. 1979, "Optical Fiber Connector", Elliott, Jr.

Primary Examiner—William L. Sikes
Assistant Examiner—Brian M. Healy
Attorney, Agent, or Firm—Anton P. Ness

[57] ABSTRACT

A fiber optic splice terminal comprises a housing assembly which receives prepared end sections of two fibers in a common end, holds them securely in an aligned relationship with their end faces adjacent a clear optical element, and reflects light emitted from one fiber, into the end face of the other fiber in a focused beam. The fibers may be secured in V-grooves of a fiber-carrying member by cover members, which cover members may be partially secured to the fiber-carrying member prior to insertion of the fibers into the V-grooves from the common end. The optical element may have reflective paraboloid forward surfaces to reflect the light. An organizer housing holds a plurality of splice terminals along one side thereof. A method is taught for using the splice terminals.

50 Claims, 7 Drawing Sheets

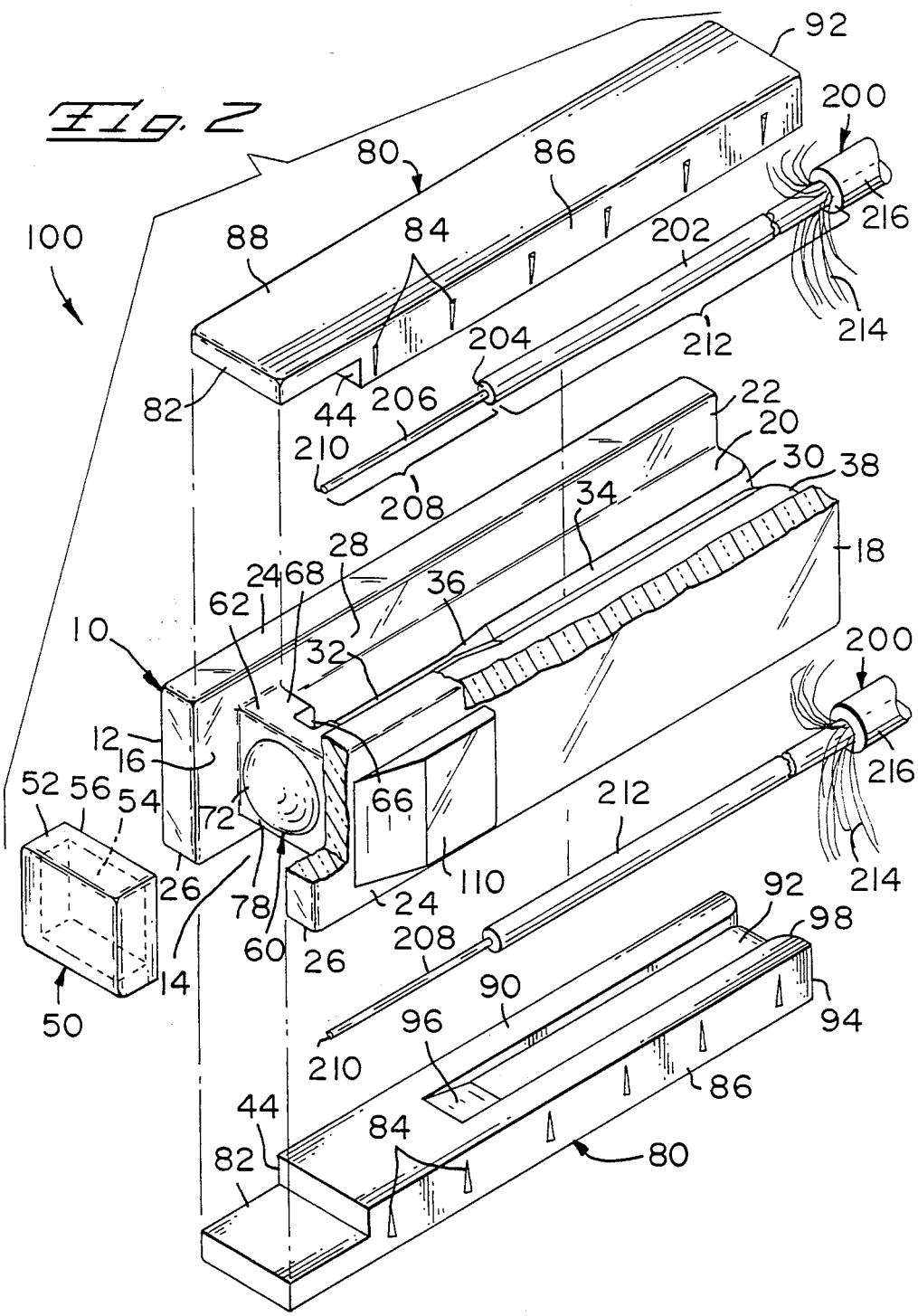

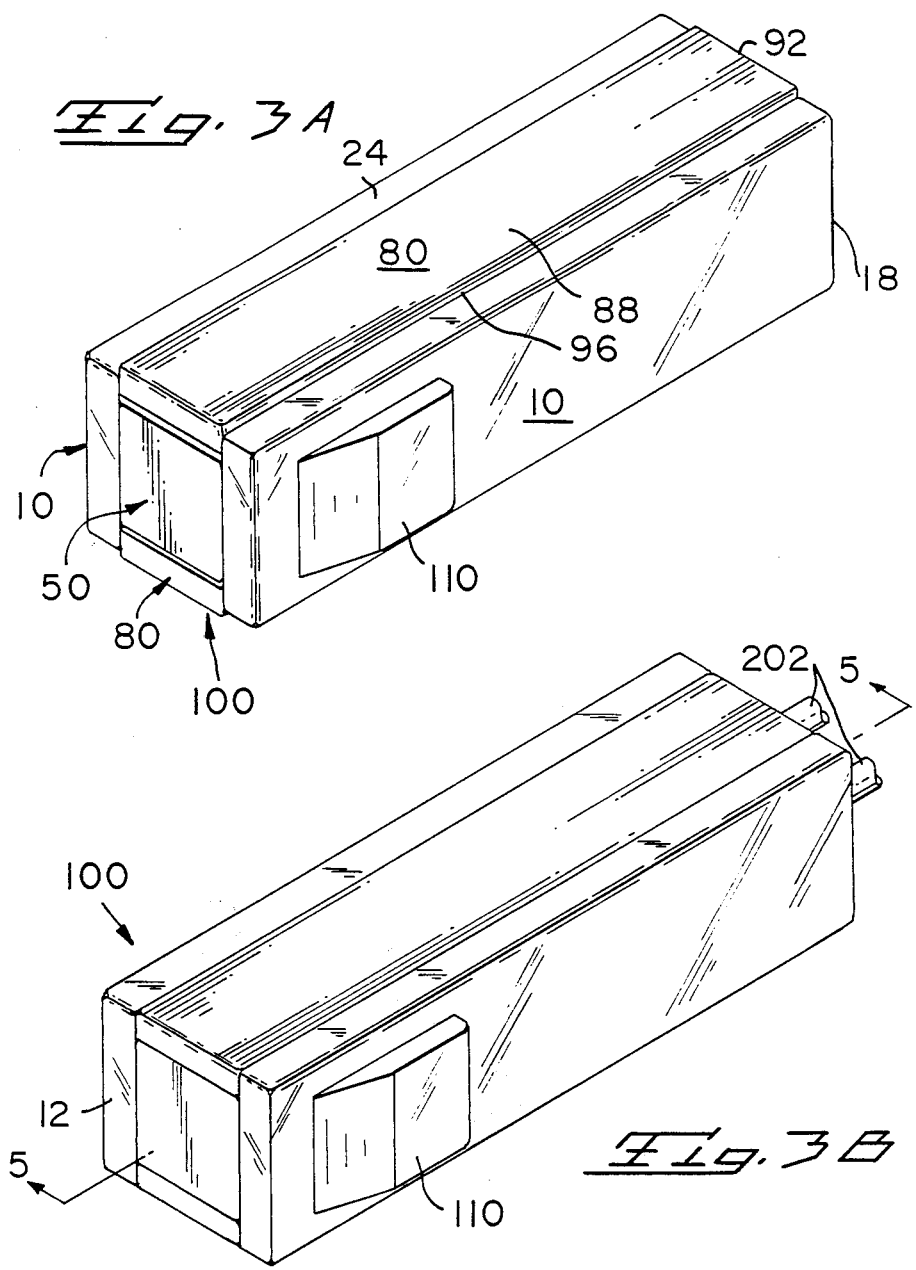

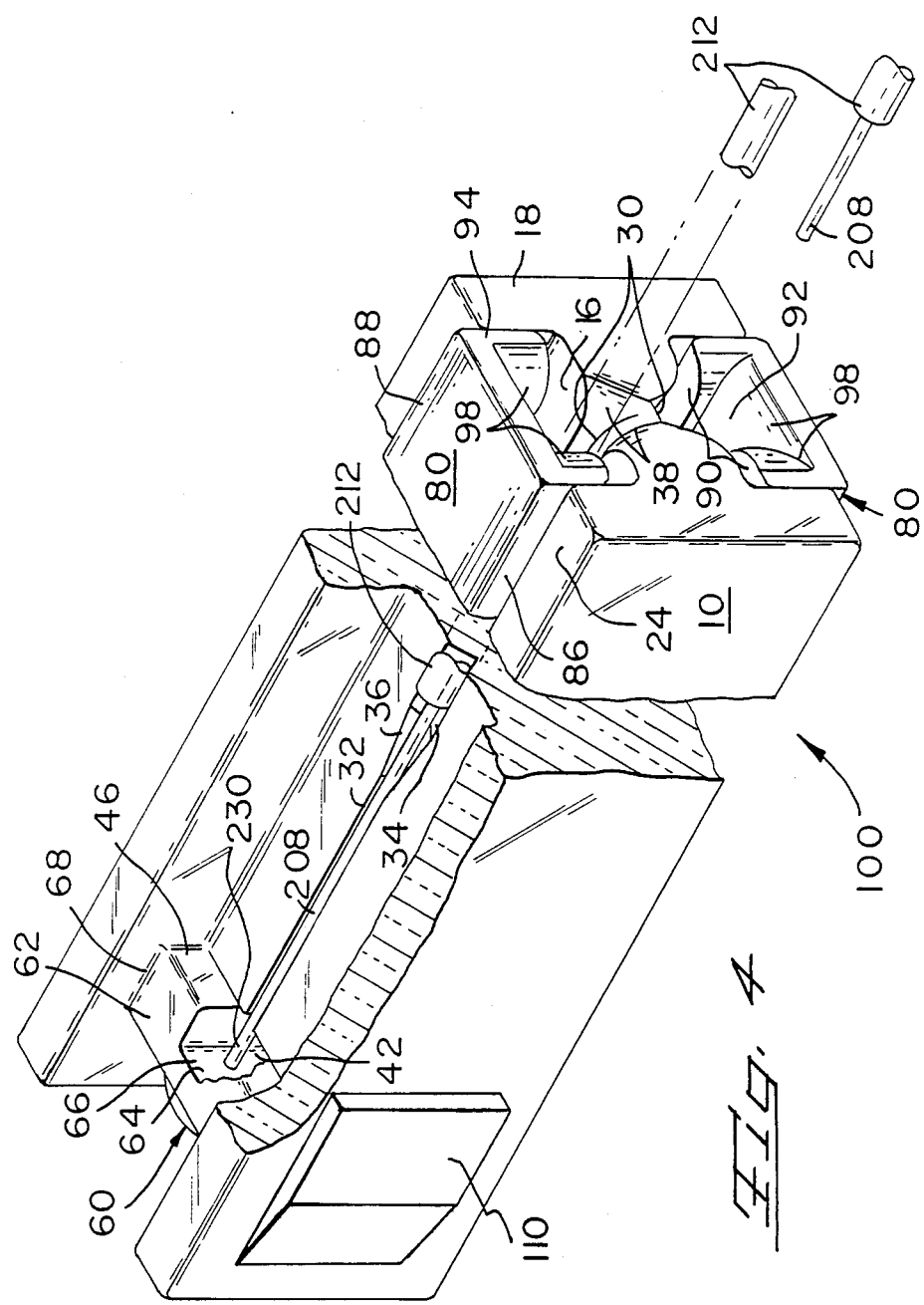

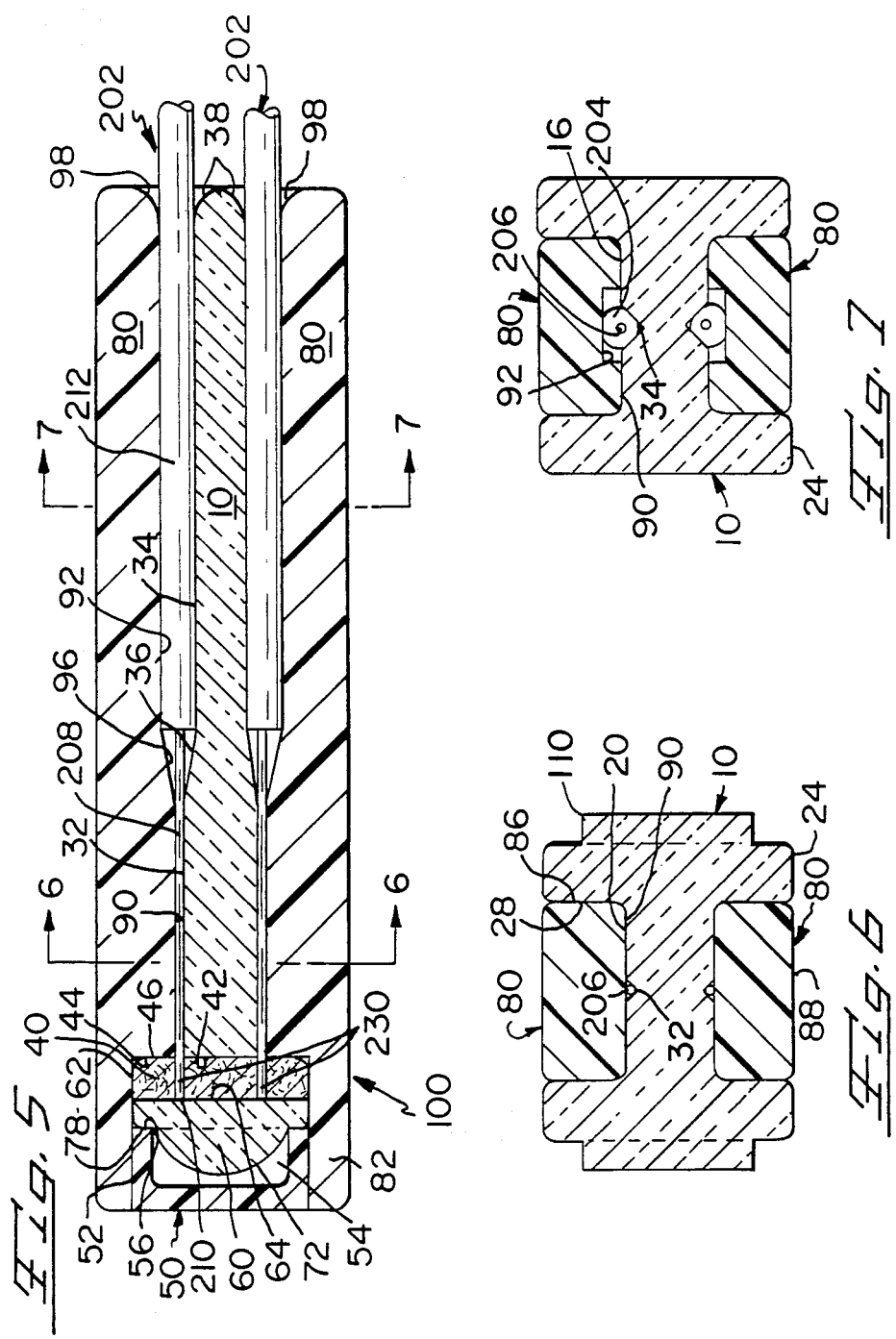

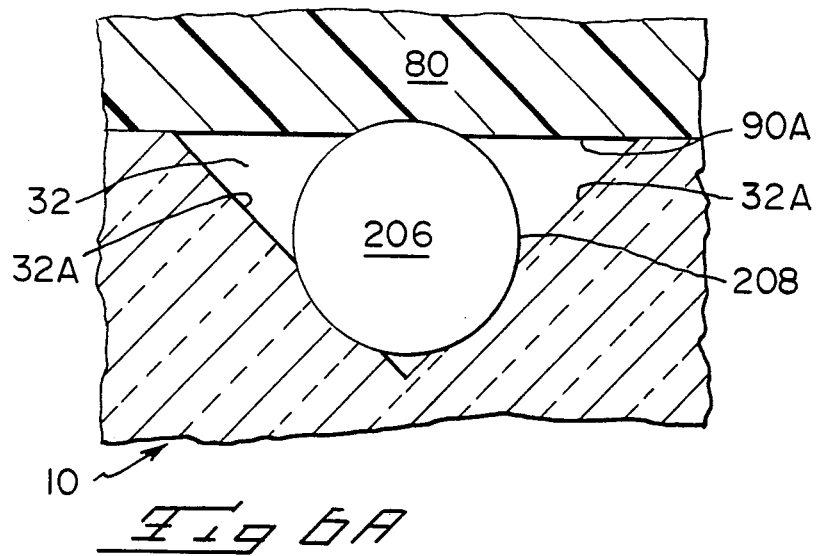
_Fig 6A_
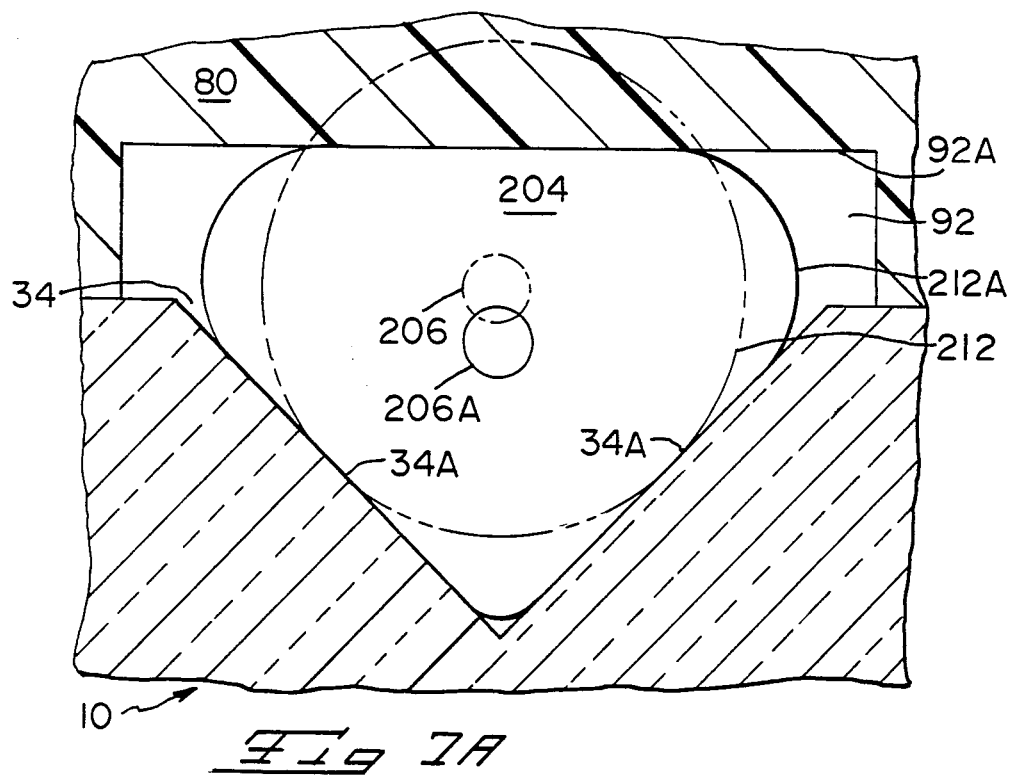
_Fig 7A_

FIBER OPTIC SPLICE TERMINAL AND METHOD OF USING SAME

FIELD OF THE INVENTION

This relates to the field of fiber optics and more specifically to optical fiber splices.

BACKGROUND OF THE INVENTION

Connectors are known which optically connect one optical fiber to another wherein the transmission core of each fiber is aligned axially with the other and is centered therewith, and a preferably polished optical end surface of each core abuts or nearly abuts against the other. An example of such a connector is disclosed in U.S. Pat. No. 4,167,303 and another in U.S. Pat. No. 4,477,146. With such connectors a ferrule may be applied to the end of each fiber in the factory under controlled conditions and with necessary equipment, to terminate the fiber. A coupling member may be applied later at the site of the connection of two thus-terminated fibers.

Fiber optic splice connectors are also known wherein an additional length of fiber may be optically connected to an unterminated first length, and with such connectors it is desirable that they be appliable under field conditions, not in the factory. An example of a splice connector is disclosed in U.S. Pat. No. 4,415,232 and 4,473,272. It is desirable that such field appliable splice connectors be easily and quickly appliable, under adverse conditions and with minimum equipment to unterminated fibers. A common feature of prior art splice connectors is that they splice the fibers in an end-to-end relationship.

Where a fiber cable contains many individual optical fibers to be spliced, such as is common in the telecommunications field and in office construction, splice connections are made at one location and are maintained in a splice enclosure such as a junction box. The splices are preferred to be kept in an organizer for ready individual access within the junction box. It is desirable that such junction boxes be large enough to allow for loops or coils of excess lengths of the spliced fibers to be contained therein without requiring very tight curvature of the loop or coil, which could damage the fibers or cause light signal losses due to bending. Also, to protect the fibers and the integrity of the light signal, the fibers must also be allowed to extend outwardly from the splice connector in a straight manner, not bent or at an angle. Prior splice connectors receive opposing fibers from opposing ends, requiring substantial associated space around the connector for the fiber extensions. Therefore, such junction boxes tend to be large, and it would be advantageous to provide a splice connector in which the fibers are spliced side by side and thus both extend outwardly from the same end of the connector, which results in less space needed within the junction box for the fiber lengths.

SUMMARY OF THE INVENTION

The present invention is a fiber optic splice terminal which splices two fiber ends with no elaborate alignment or centering procedure nor equipment therefor. The splice terminal has a fiber-carrying member to receive fiber lengths from the same end with alignment means to precisely position the transmissive core of each fiber along fixed lines a preselected distance apart and at a fixed angle to each other, and also to receive the optical end faces of each fiber at a fixed position along the axis of the fiber-carrying member. Light emitted from the optical end face of one fiber is reflected by reflective means secured to the fiber-carrying member, and is received in a focused beam by the optical end face of the other fiber.

In one embodiment, the splice terminal is an assembly comprising a precision fiber-carrying member and two precision cover members which are securable thereto after prepared end portions of two optical fibers have been disposed along the fiber-carrying member. The end portion of each fiber is disposed in a precisely located shallow fiber-receiving groove axially along each of two opposing surface of the fiber-carrying member from a rearward end toward the forward end thereof. Upon placement of a respective cover member against the respective surface of the fiber-carrying member, each fiber is compressed further into the groove. The forward end portion of each groove is shallow and has a V-shaped to receive the stripped end portion of the fiber, which fiber end is thereby precisely located axially along the groove. In another embodiment both grooves may be disposed on the same surface, and only one cover member is needed.

An element of optically clear material is situated at the forward ends of the fiber-receiving grooves. The element's surface adjacent the forward groove ends (the fiber-proximate surface) is locally axially normal to each groove and therefor axially normal to the prepared optical end face of each fiber secured in the groove. Spaced a preselected distance beyond the fiber-proximate surface are two reflective surfaces of appropriate geometry and orientation such that light transmitted from the end face of one fiber is transmitted through the optical element, is reflected by a first reflective surface in a collimated beam. The collimated beam is then reflected by the second reflective surface in a focused beam to be received by the end face of the other fiber.

One embodiment of the fiber-carrying member/optical element subassembly of the splice terminal of the present invention is especially useful with multi-mode fibers and comprises a fiber-carrying member with which the optical element is integral, such as a single precision molded article of optically clear plastic material. The reflective surface have a paraboloid shape disposed on a fiber-remote surface of the optical element and constituting an outer surface of the molded article, preferably recessed from the forward end surface of the fiber-carrying member. The reflective ability of the fiber-remote surface may optionally derive from an air or gas interface or a highly reflective metallic or dielectric coating or the like. A protective cap is preferably secured thereover and should hermetically seal about the reflective surface at least to keep dust, moisture and dirt from the reflective surface, and if an air or gas interface is used, to be airtight and also opaque. A further opaque covering over the splice terminal may be used after completing the splice, to block out ambient light.

The splice terminal of the present invention splices the fibers in a side-by-side, spaced relationship and is long enough to provide strain relief to the fibers.

The present invention also includes an organizer for the applied splice terminals of the present invention to be contained in a junction box or other enclosure. The organizer comprises a housing having openings each to receive the forward end of a splice terminal, having appropriate shape and size, and with latching means such as apertures in sidewalls thereof within which cooperating latching projections on sidewalls of the splice terminal may enter and latchingly secure.

BRIEF DESCRIPTION OF THE DRAWINGS

FIG. 2 is an exploded perspective view of the splice terminal assembly of the invention.

FIGS. 3A and 3B are perspective views of the splice terminal of FIG. 2, partly and fully assembled, respectively.

FIG. 4 is a perspective view end of the partly assembled terminal in FIG. 3A, from rearwardly thereof.

FIG. 5 is a longitudinal section view taken along line 5—5 of FIG. 3B.

FIGS. 6 and 7 are cross-sectional views taken along lines 6—6 and 7—7 respectively, of FIG. 5.

FIGS. 6A and 7A are enlarged portions of FIGS. 6 and 7 showing fibers in respective groove portions of the splice terminal, with FIG. 6A being greatly enlarged.

DETAILED DESCRIPTION OF THE PREFERRED EMBODIMENT

Figure 1:
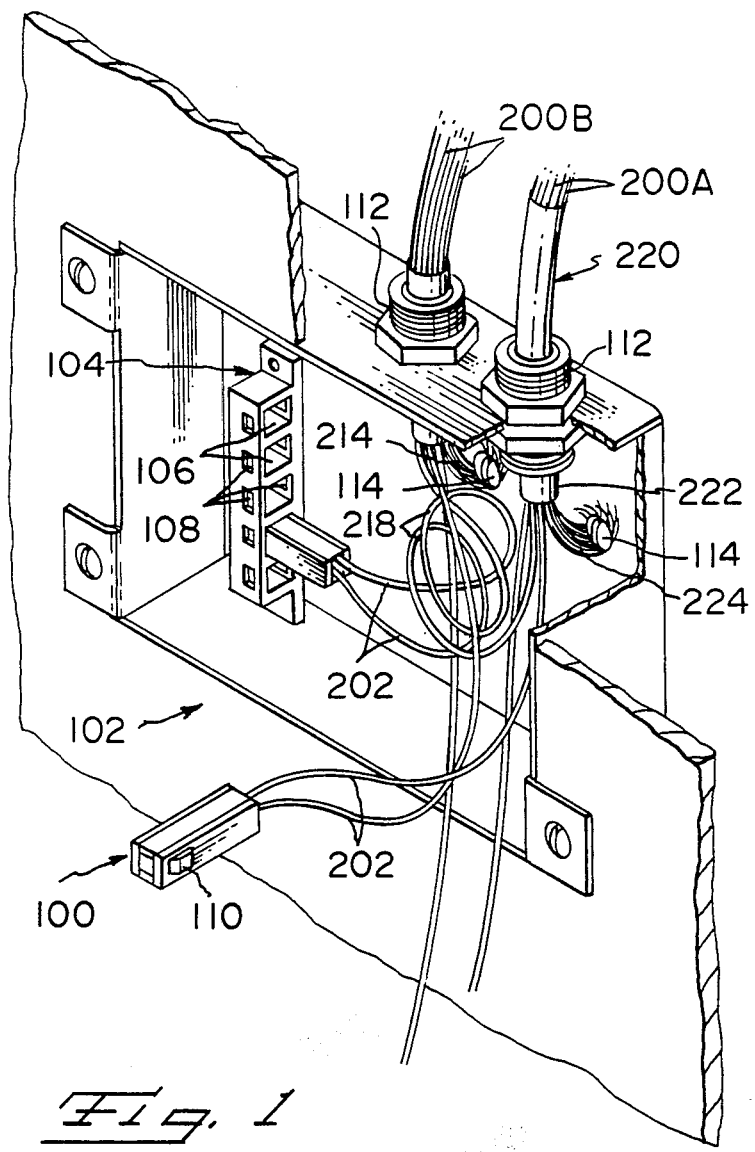
FIG. 1 is a perspective view of a junction box for optical fiber splice connections.

FIG. 1 illustrates a junction box 102 within which fibers 200 may be spliced using splice terminal assemblies 100 of the present invention. Splice terminals 100 are securable in openings 106 of a front wall of box-like organizer housing 104 by paired latching projections 110 on opposing sides of splice terminals 100 latchingly seating in corresponding paired apertures 108 in opposing side walls of housing 104 associated with each of the openings 106. As shown in FIG. 1, a cable 220 of fibers 200A enters junction box 102 through cable clamp 112, outer jacket 222 is removed from cable 220 within junction box 102, exposing strength members 224 around fibers 200A which are then bunched together and fastened to a wall of junction box 102 by fastener 114. A bundle of fibers 200B also enters junction box through a cable clamp 112, outer jackets 216 (best seen in FIG. 2) of fibers 200B are removed and strength members 214 are similarly fastened to a wall of junction box 102 by a fastener 114. Within junction box 102 one of fibers 200A is to be spliced to one of fibers 200B and throughout the remainder of the discussion no distinction will be made between them; instead, reference will be made to end sections thereof as fibers 202, having buffer material therearound. Two cables 220 or two bundles may be used with a junction box 102, as desired. Junction box 102 may be panel mounted or wall mounted in a conventional manner.

Large loops 218 of fibers 202 are disposed in the space associated with the splice connection, which space is to be allowed by junction box 102 and limited in size thereby. Both fibers 202 after splicing extend from the same end of each splice connector 100 of the invention and may be generally routed together in the same loop 218. For economy of space the splice terminals 100 may preferably be secured in the same side of organizer housing 104 which is mounted to one side of junction box 102, and all loops 218 are able to be disposed adjacent each other.

A fiber optic splice terminal 100 of the present invention is shown in FIG. 2 comprising a fiber-carrying member 10 and two identical cover members 80 to splice end sections of two optical fibers 202. Forward end 12 of member 10 preferably includes a forward recess 14 formed by opposing forward wall portions 16. Axially adjacent forward recess 14 is a light-transition means or optical element 60. A cap member 50 is preferred to be secured in forwrad recess 14 which will be further described below. End sections of fibers 202 are disposed in profiled shallow grooves 30 extending along parallel opposing fiber-carrying surfaces 20 respectively from a rearward end 18 of fiber-carrying member 10 forwardly to optical element 60. Cover members 80, when fully applied, will be secured to fiber-carrying member 10 adjacent fiber-carrying surfaces 20 controllably pressing and holding fibers 202 securely within grooves 30 and forming splice terminal 100, as shown in FIG. 3B.

Opposing fiber-carrying surfaces 20 of fiber-carrying member 10 are disposed in longitudinal recesses 22 formed by opposing sidewalls 24. Each cover member 80 is of a width to interference fit in a recess 22 between opposing sidewalls 24. A forward hood section 82 of each cover member 80 extends forwardly past an associated side 62 of optical element 60, is coterminate with forward end 12 of fiber-carrying member 10, and engages opposing surfaces 52 of cap member 50. Cover members 80 are securable in recesses 22 by means of projections 84 on sides 86 which are increasingly outwardly tapered toward the outer cover surface 88 to a barbed point so as to resist removal of a cover member 80 by digging sharply into the inside wall surfaces 28 of sidewalls 24. Adhesive material may be used, if desired. Also it may be desired to so dimension openings 106 of organizer housing 104 such that splice terminals 100 fit therein in slight interference fit, to assist maintaining cover members 80 in fully applied condition.

Each fiber 202 is prepared in a conventional manner by stripping away the outer jacket 216, strength members 214 (and inner jacket, if any), if present near the splice area, from at least the entire section of the optical fiber to be placed in the splice terminal. Then buffer material 204 is carefully stripped from the fiber optic transmission member 206 (having a transmissive core and cladding) for a preselected distance from the end of the fiber, forming a stripped fiber length 208. The end of the fiber is prepared into an optical end face 210 by carefully cleaving or by cutting and optically polishing, all as is known in the art, which end face will be axially normal to the axis of transmission member 206.

In the preferred embodiment of the invention, each profiled groove 30 is precisely located centrally of a fiber-carrying surface 20 of fiber-carrying member 10 and has a V-shape such that a respective fiber 202 and especially stripped fiber length 208 thereof is centered laterally with respect to fiber-carrying surface 20 of member 10 when secured in groove 30. Each groove 30 has a small V-shaped forward groove portion 32 in which is disposed a respective stripped fiber length 208, forward groove portion 32 being dimensioned such that substantially most of the cross-section of core length 208 is disposed within forward groove portion 32 prior to applying a cover member 80. Rearward from forward groove portion 32 is larger rearward groove portion 34 dimensioned to receive buffered length 212 of fiber 202 where substantially the outer cross-sectional half of buffered length 212 extends laterally outward from surface 20 prior to fully applying a respective cover member 80.

The inner surface 90 of each cover member 80 engages a respective fiber-carrying surface 20 when cover member 80 is fully applied, and has a shallow, wide central channel 92 therein extending longitudinally forwardly from a rear end 94 of cover member 80 associated with, and as long as, an associated rearward groove portion 34 such that the exposed outer half of a buffered fiber length 212 is disposed therein prior to fully aplying a respective cover member 80.

In the preferred embodiment, cover members 80 are first partly secured to a respective side of fiber-carrying member 10 parallel to but spaced a small distance from a respective fiber-carrying surface 20, the small distance selected to be less than the diameter of transmission member 206. This partial assembly may be performed at the factory, for the convenience of handling prior to and at the point of splicing. Cover members 80 may be held in such partially applied condition, as shown in FIG. 3A, by projections 84 partly digging into inside wall surfaces 28 of sidewalls 24. Rounded corners 38 of fiber-carrying member 10 at the rearward end of each groove 30, in cooperation with rounded corners and edges 98 at the rearward end of channel 92 of each cover member 80, provide a lead-in for inserting a respective end of stripped fiber length 208 of a fiber 202 from rearward end 18, 94, as is shown in FIG. 4. As each fiber 202 is carefully urged forward into partly assembled splice terminal 100, the V-shaped of rearward groove portion 34 guide the tip of stripped fiber length 208 until it meets tapered narrowing portion 36 of groove 30 between rearward groove portion 34 and forward groove portion 32, opposed from tapered surface 96 of channel 92 of cover member 80, whereupon the tip of stripped fiber length 208 is gently guided into forward groove portion 32 as it is moved forwardly. Each fiber is continued to be carefully urged forward until optical end face 210 abuts fiber-proximate surface 64 of optical element 60. When both fibers 202 have been thus fully inserted into partly assembled splice terminal 100, cover members 80 are now fully applied by being urged tightly against fiber-carrying member 10, such as by use of a conventional fiber optic crimping tool (not shown). Care should be taken to retain fibers 202 in their proper position with optical end faces 210 abutting fiber-proximate surface 64 by gripping the portions of fibers 202 extending rearwardly from splice terminal 100. A clamping means or cooperating latching means (not shown) may optionally now be used to assure that cover members 80 are retained securely on fiber-carrying member 10.

During the splicing procedure described above, each fiber 202 is inserted into a groove 30 from rearward end 18 of splice terminal 100, is pressed into the groove 30 and centered therein and is securely held in splice terminal 100, as shown in FIG. 5. As shown in FIG. 6, each stripped fiber length 208 is held in forward groove portion 32, and as shown in FIG. 7, each buffered fiber length 212 is held in rearward groove portion 34 and associated channel 92 of cover member 80. The two fiber transmission members 206 are parallel to each other a preselected distance apart. Stripped fiber length 208 is secured within forward groove portion 32, engaged firmly by the two sides 32A thereof and inside surface 90A of a respective cover member 80, slightly deforming two sides 32A and surface 90A, as seen in FIG. 6A in which is shown a greatly enlarged portion of FIG. 6 around a groove 32. Buffered fiber length 212 is secured within rearward groove portion 34, engaged firmly by the two sides 34A thereof and channel bottom surface 92A of a respective cover member 80, as seen in FIG. 7A, an enlarged portion of FIG. 7 around a groove 34. Because buffer material 204 is softer than the material from which fiber-carrying member 10 and cover members 80 are preferred to be made, buffer material 204 will be deformed by sides 34 and surface 92A, being extruded cross-sectionally into a somewhat triangular configuration 212A; also, that portion of transmission core 206 within buffered fiber length 212 will be substantially translated deeper into the V-shaped of rearward groove portion 34 to location 206A. The design and the dimensions of the V-shaped of each portion of grooves 30, and that of channel 92, are selected to be such as are appropriate to the particular diameter of transmission member 206 and buffered fiber length 212, so that transmission member 206 is substantially straight throughout splice terminal 100 after completion of the splice. It is preferred to utilize an angle of about 90° for the V. It is also preferred that cover members 80 have substantially the same hardness as that of fiber-carrying member 10, and the same coefficient of thermal expansion.

Optical end face 210 of each fiber is now located adjacent a portion of fiber-proximate surface 64 of optical element 60, and conventional index-matching liquid or gel material may optionally but preferably be used to assure the integrity of the optical connection between each optical end face 210 and fiber-proximate surface 64 of optical element 60. At least at each portion adjacent each optical end face 210, fiber-proximate surface 64 is axially normal to the axis of transmission member 206.

It is preferred to have a slot 66 in optical element 60 to create a spacing rearwardly from fiber-proximate surface 64, and preferably contains index-matching material 40 such as Optical Gel Code No. 0607 or Laser Liquid Code No. S1056 both sold by R. P. Cargille Laboratories, Inc. of Cedar Grove, N.J. Slot 66 will receive tip sections 230 of stripped fiber lengths 208 and extends in a direction containing the tip sections 230 of the fibers and therefore is generally axially normal to grooves 30. Slot 66 is formed by rearwardly-extending parallel wall portions 68 of optical element 60, by forwardly-facing surface 42 of fiber-carrying member 10 at which surface grooves 30 terminate, and by forwardly-facing shoulders 44 of cover members 80 which abut against rearwardly-facing surfaces 46 of wall portions 68 of optical element 60. The cross-sectional area of slot 66 is preferred to be small enough that the typical viscosity of index-matching material 40 will be sufficient for material 40 to self-retain within slot 66, and it is placed therein prior to partial assembly of cover members 80 to fiber-carrying member 10. Slot 66 is further preferred to allow for any debris pushed forward by a fiber 202 being inserted, to move from in between optical end face 210 and fiber-proximate surface 64 as it enters into abutment therewith. Another benefit resulting from slot 66 relates to the precision molding of fiber-carrying member and optical element 60 integral therewith: spacing the ends of grooves 30 from fiber-proximate surface 64 eliminates the problem of imprecise sharp-corner definition at the normal abutment of the surfaces 32A with surface 64 which would be expected to result from the machining or forming of the mold dies, or from wear and tear thereof, from less-than-perfect cleaning of the mold cavity, or from the viscosity of the plastic material used, or all of these factors; such imprecise sharp-corner definition could result in non-normal abutment of an optical end face with the fiber-proximate surface.

Optical element or light-transition means 60 is of optically clear material, and may be of such material as optical grade acrylic or glass material. It is preferred that optical element 60 be integral with fiber-carrying member 10 and even more preferred that optical element 60 and fiber-carrying member 10 be integrally precision molded of optically clear thermoplastic material such as polyacrylate, polystyrene, polycarbonate or polysulfone, or copolymers thereof, and so forth. Optical element 60 has a preselected dimension forwardly of fiber-proximate surface 64, ending in a forward or fiber-remote surface 72.

Figure 8:
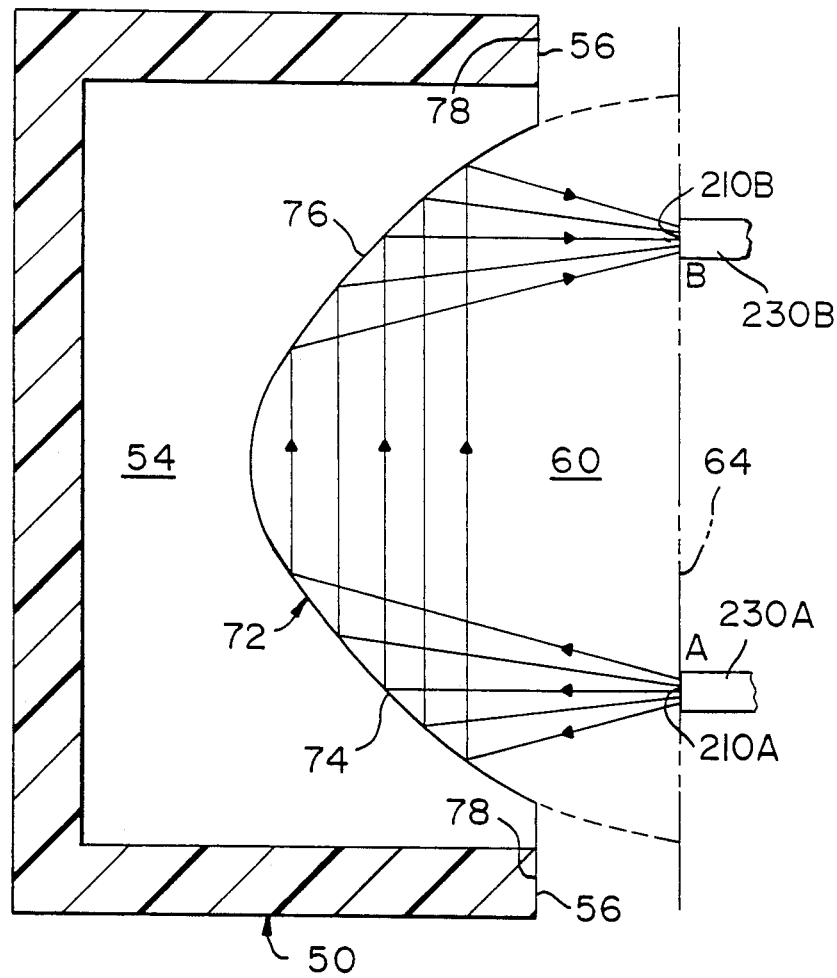
FIG. 8 is a diagrammatic representation of the optical path of one embodiment.

Fiber-remote surface 72 has a curvature precisely preselected in association with the fibers' optical parameters, the distance between surface 72 and optical end faces 210, and the distance between the centers of the two parallel fiber transmission members 206. It is preferred that the curvature be paraboloid. As illustrated in FIG. 8, assuming the surface 72 were reflective: light would be emitted from one optical end face 210A of fiber tip 230A, at focal point A received by optical element 60 through fiber-proximate surface 64, transmitted through element 60, reflected by surface 72 at a first reflective surface portion 74 in a collimated beam through element 60, reflected by a second reflective surface portion 76 in a focused beam through element 60 to fiber-proximate surface 64 at focal point B, and received by the other optical end face 210B of fiber tip 230B thereat.

Fiber-remote surface 72 is made reflective by creating an air or gas interface thereat or by applying an appropriately highly reflective metallic or dielectric coating thereover. Cap member 50 is secured to the forward portion of optical element 60 within forward recess 14 and has a large recess 54 to surround fiber-remote surface 72 to provide protection to surface 72 to prevent dust, dirt and humidity from reaching it. Cap member 50 may also be used, by being appropriately hermetically sealed to periphery 78 around surface 72 so that a reservoir of dry air, dry inert gas, or preferably, dry nitrogen may be created in large recess 54 to provide a gas interface at surface 72, which is the preferred method. In such an embodiment cap member 50 should also be opaque. Peripheral rear surface 56 of cap member 50 is preferably ultrasonically welded to the periphery 78 of the fiber-remote forward end of optical element 60 soon after fiber-carrying member 10 is molded with an integral optical element 60 therein (or soon after optical element 60 is secured thereto, if a separate member). Cap member 50 could be bonded thereto using ultraviolet- or visible-light curable adhesive known in the art. A cap member 50 of appropriate width may optionally be bonded or welded to periphery 78 without being disposed in a forward recess 14; that is, it may extend forwardly from optical element or light-transition means 60 without being bounded by any forward wall portions 14; but it may be desirable to have forward cover portions 82 overlap surfaces 52 thereof.

Especially during the partial assembly of splice terminal 100 at the factory, care should be take to eliminate dust and debris from all interior surfaces prior to partially applying the cover members, and to maintain the splice terminal in such clean condition until the splice is actually completed.

It may be desired to place an opaque covering over the splice terminal after completing the splice. It may also be desired to utilize an opaque organizer housing to assist in blocking out ambient light. In another embodiment of the present invention (not shown) a single fiber-carrying surface may contain both fiber-carrying grooves, in a parallel, precisely-spaced alignment to receive fibers therein, such that upon applying a single cover member thereto the fibers will be secured therein so that their optical end faces are located at the two designated focal points on the fiber-proximate surface of the optical element.

It is also within the scope of the present invention that the grooves and fibers therein may be disposed at a preselected small angle from being parallel, and paraboloid reflective surfaces oriented accordingly to receive light from a slight angle to the direction of the longitudinal axis of the splice terminal, and reflect the light into the appropriate direction to be received by the receiving fiber. The fiber-proximate surface portions should still be locally axially normal to the optical fiber transmission members.

If a separate optical element is secured to the fiber-carrying member, care must be taken to align the focal points of the fiber-proximate surface precisely with the ends of the fiber-carrying grooves, and to align the fiber-proximate surface to be axially normal to the optical fiber transmission members in the grooves. It is within the scope of the present invention that the optical element may be a lens elements to receive light from one fiber's optical end face, transmit it to an associated reflective surface and receive and refocus the reflected light into the other fiber's optical end face.

It is additionally within the scope of the present invention to use fiber alignment means other than V-shaped grooves, such as arcuate grooves or optionally a three-rod arrangement (as in U.S. Pat. No. 4,473,272) about a fiber, in a splice terminal wherein fibers are spliced in a spaced, side-by-side relationship, both extending from a single end of the splice terminal. In a three-rod arrangement, cover members may be useful in applying compressive force to the rod to urge them firmly against the optical fiber to center a stripped fiber length within the passageway central of the rods as in FIG. 6a, or a buffered fiber length deformably between the rods similarly to the arrangement of FIG. 7A, or both.

Other variations in the design and structure of the splice terminal and the organizer housing therefor may occur to those skilled in the art, without departing from the scope of the claims or the spirit of the invention.

What is claimed is:

1. An optical fiber splice terminal to receive and secure therein prepared end sections of two optical fibers to optically splice the two optical fibers together without the fiber end sections having respective terminals previously terminated thereonto, comprising:
   a housing means having a fiber-receiving end and two laterally spaced fiber-alignment means coextending axially forward from said fiber-receiving end each to receive and hold a said prepared end section of a respective said optical fiber in a preselected alignment with an optical end face of each said optical fiber to be disposed in a preselected location within said housing means when said prepared fiber end sections are inserted and secured therein, said housing means including means for securing said prepared fiber end sections;
   a light-transition means within said housing means and having a fiber-proximate surface portions proximate said preselected locations and a fiber-remote surface each having preselected shapes; and reflective means associated with said light-transition means, said reflective means having a predetermined geometry corresponding with the said preselected locations such that light emittable from one said optical end face is receivable by said light-transition means through a said fiber-proximate surface portion, is reflectable by said reflective means and is receivable in a focused beam by the other said optical end face after said prepared end sections of said two optical fibers are secured in said fiber-alignment means with said optical end faces thereof disposed at respective said preselected locations, whereby a splice terminal assembly is defined ready to receive end sections of two optical fibers thereinto which will be optically spliced by being appropriately inserted and secured therein, without the fiber end sections previously requiring respective terminals to be terminated thereonto.

2. An optical fiber splice terminal as set forth in claim 1 wherein said light-transition means is a member of optically clear material, with said fiber-proximate surface portions thereof axially normal to each respective optical fiber adjacent the respective optical end face thereof upon fiber insertion.

3. An optical fiber splice terminal as set forth in claim 1 wherein said reflective means comprises reflective fiber-remote surface portions of said light-transition means.

4. An optical fiber splice terminal as set forth in claim 3 wherein said reflective fiber-remote surface portions have a reflective coating thereon.

5. An optical fiber splice terminal as set forth in claim 4 wherein said reflective coating is metallic.

6. An optical fiber splice terminal as set forth in claim 4 wherein said reflective coating is dielectric material.

7. An optical fiber splice terminal as set forth in claim 3 wherein said reflective fiber-remote surface portions interface with gas.

8. An optical fiber splice terminal as set forth in claim 7 wherein said gas is dry nitrogen.

9. An optical fiber splice terminal as set forth in claim 7 wherein said gas is dry air.

10. An optical fiber splice terminal as set forth in claim 7 wherein said gas is an inert gas.

11. An optical fiber splice terminal as set forth in claim 7 wherein said gas is contained in a hermetically sealed reservoir in said housing means.

12. An optical fiber splice terminal as set forth in claim 3 wherein said housing means includes a cap means on one of said housing means or said light-transition means such that said reflective fiber-remote surface portions of said light-transition means are hermetically sealed within said housing means and said cap means.

13. An optical fiber splice terminal as set forth in claim 7 wherein said housing means includes a cap means on one of said housing means or said light-transition means, and a hermetically sealed reservoir of said gas is thereby created adjacent said reflective fiber-remote surface portions of said light-transition means.

14. An optical fiber splice terminal as set forth in claim 13 wherein said cap means is a cap member sealingly secured to said light-transition means.

15. An optical fiber splice terminal as set forth in claim 1 wherein said reflective means comprises a pair of paraboloid reflective surfaces having a preselected orientation and spacing with respect to each other and to the said preselected locations and axes of said fiber-alignment means such that light emittable from one said optical end face of a said optical fiber inserted and secured in a said fiber-alignment means transits a first portion of said light-transition means, is received by an associated one said paraboloid reflective surface, is collimated thereby and reflected toward the other paraboloid reflective surface, is focused thereby and reflected toward the optical end face of the other said optical fiber inserted and secured in the other said fiber-alignment means, transits a second portion of said light-transition means, and is received in a focused beam by the other said optical end face.

16. An optical fiber splice terminal as set forth in claim 15 wherein said pair of paraboloid reflective surfaces are disposed on fiber-remote surface portions of said light-transition means, each said optical end face being locatable securely in said housing means at a respective focal point of an associated said paraboloid reflective surface proximate a respective said fiber-proximate surface portion of said light-transition means.

17. An optical fiber splice terminal as set forth in claim 1 wherein said housing means comprises a fiber-carrying member having a fiber-carrying surface whereon said two fiber-alignment means are disposed to each receive and align a respective said prepared end section of an optical fiber.

18. An optical fiber splice terminal as set forth in claim 17 wherein said housing means further comprises a cover member securable to said fiber-carrying member adjacent said fiber-carrying surface to secure said optical fiber end sections in said fiber-alignment means.

19. An optical fiber splice terminal as set forth in claim 18 wherein said cover member is securable within a longitudinal recess of said fiber-carrying member.

20. An optical fiber splice terminal as set forth in claim 1 wherein said housing means comprises a fiber-carrying member having two fiber-carrying surfaces on opposite sides thereof whereon each of which is disposed a fiber-alignment means to receive and align a respective said prepared end section of an optical fiber.

21. An optical fiber splice terminal as set forth in claim 20 wherein said housing means further comprises a pair of cover members ecah associated with a respective said fiber-carrying surface and securable adjacent thereto to secure a respective said optical fiber end section in a respective said fiber-alignment means.

22. An optical fiber splice terminal as set forth in claim 21 wherein said fiber-alignment means are V-shaped grooves and said cover members have inner surface portions adjacent respective said V-shaped grooves to secure each said optical fiber end section in a respective and said V-shaped groove after insertion of said end sections thereinto.

23. An optical fiber splice terminal as set forth in claim 22 wherein said V-shaped grooves are profiled and have a larger rearward groove portion associated with a buffered fiber portion of an associated fiber end section and in communication with said fiber-receiving end of said housing means, and a smaller forward groove portion associated with a stripped fiber portion of said associated fiber end section and extending forwardly from said rearward groove portion, and said inner surface of each said cover member has a shallow channel therealong coextensive with said larger rearward groove portion, such that a said associated fiber end section is securable in said V-shaped groove by a respective said cover member with said buffered fiber portion securable in said larger rearward groove portion, said stripped fiber portion securable in said smaller forward groove portion, said optical end face of said associated optical fiber located at a said preselected location proximate said light-transition means, and buffer material of said buffered fiber portion deformable by sides of said rearward groove portion and said respective cover member.

24. An optical fiber splice terminal as set forth in claim 23 wherein each said V-shaped groove has a tapered groove portion intermediate said larger rearward groove portion and said smaller forward groove portion such that a tip portion of an end section of a said associated optical fiber being inserted into said housing means from said fiber-receiving end between said fiber-carrying member and a respective said cover member partially applied to said fiber-carrying member, is guided from said larger rearward groove portion into said smaller forward groove portion.

25. An optical fiber splice terminal as set forth in claim 21 wherein each said cover member is securable within a longitudinal recess associated with each said fiber-carrying surface of said fiber-carrying member.

26. An optical fiber splice terminal as set forth in claim 20 wherein said light-transition means is secured to said fiber-carrying member.

27. An optical fiber splice terminal as set forth in claim 20 wherein said fiber-carrying member is molded from optically clear material and said light-transition means is integrally molded therewith.

28. An optical fiber splice terminal as set forth in claim 27 wherein said fiber-alignment means are V-shaped grooves terminating a preselected distance from said fiber-proximate surface portions of said integral light-transition means.

29. An optical fiber splice terminal as set forth in claim 28 wherein said V-shaped grooves terminate at a transverse slot wherein is disposed index-matching material adjacent said fiber-proximate surface portions.

30. An optical fiber splice terminal as set forth in claim 1 wherein an opaque covering is secured over at least a portion of said housing means, disposed forwardly from said fiber-receiving end thereof.

31. An organizer housing for optical fiber splice terminals splicing pairs of optical fibers in side-by-side relationship such that each of said pairs of said optical fibers extends outwardly from a common end of a respective one of said splice terminals, comprising:
a box-like housing including a front wall and opposing side walls extending rearwardly from sides of said front wall, said front wall having a plurality of terminal-receiving openings therealong to receive said splice terminals thereinto such that said splice pairs of optical fibers extend outwardly from said front wall and thus extend outwardly from a common side of said housing.

32. An organizer housing as set forth in claim 3 wherein said opposing side walls are positioned to be adjacent opposing sides of said splice terminals upon insertion thereof into respective said terminal-receiving openings and have latching apertures to latchingly receive cooperating latching projections on said sides of said splice terminals.

33. An organizer housing as set forth in claim 31 wherein said splice terminals have at least one cover member secured to a respective fiber-carrying surface of a fiber-carrying member, and said openings are dimensioned such that wall surfaces of said openings firmly hold said at least one cover member adjacent said fiber-carrying surface to secure said pairs of optical fibers therein.

34. An organizer housing as set forth in claim 31 wherein said housing is opaque.

35. A method of optically splicing two optical fibers comprising the steps of:
forming a fiber-carrying member of a splice terminal assembly having a fiber alignment means for end sections of two optical fibers longitudinally extending along at least one fiber-carrying surface thereof from a common end of said fiber-carrying member;
forming at least one cover member for an associated said at least one fiber-carrying surface;
partially inserting in interference fit said at least one cover member in a respective longitudinal recess along said fiber-carrying member wherein said at least one fiber-carrying surface is disposed, such that an inner surface of said at least one cover member is proximate and spaced from said fiber-carrying surface a preselected small distance, whereby a preassembled splice terminal is defined ready to be applied to end sections of a pair of optical fibers;
preparing end section of two optical fibers to be spliced including optically preparing end faces of transmission members of said fibers and removing buffer material from a predetermined stripped fiber length of each of said transmission members;
inserting each said prepared fiber end sections into an end of a respective fiber-alignment means disposed on said common end of said fiber-carrying member and urging each said end section forwardly into said fiber-alignment means until said optical end face of said fiber abuts an axially normal fiber-proximate surface portion of a light-transition means of said fiber-carrying member near a forward end thereof; and
fully applying said at least one cover member by fully inserting and securing said member into said respective longitudinal recess, thereby and thereafter applying resilient force to secure a respective fiber end section in said fiber-alignment means, whereby said two end sections of said optical fibers are secured in said splice terminal assembly in a substantially parallel alignment with optical end faces disposed adjacent said light-transition means at focal points thereof so that light emitted from one said optical end face is received by said light-transition means, reflected by reflective means of said splice terminal assembly and refocused and received by the other said optical end face.

36. The method as set forth in claim 35 wherein said forming of said fiber-carrying member comprises molding said member from optically clear material, and said light-transition means is integrally molded therewith.

37. The method as set forth in claim 36 wherein a spacing is formed between proximate ends of said fiber-alignment means and a fiber-proximate surface of said light-transition means, and index-matching material is placed into said spacing prior to said partial insertion of said at least one cover member to said fiber-carrying member.

38. The method as set forth in claim 35 wherein said forming of said fiber-carrying member further comprises preparing fiber-remote surface portions of said light-transition means into preselected shapes appropriate to constitute said reflective surfaces with respect to said focal points of said light-transition means.

39. The method as set forth in claim 38 wherein a hermetically sealed reservoir is formed adjacent said fiber-remote surface portions containing selected gas, by securing a cap member to one of said fiber-carrying member or said light-transition means, prior to said partial insertion of said at least one cover member to said fiber-carrying member.

40. The method as set forth in claim 39 wherein said reflective surfaces are first coated with reflective material.

41. A method of optically splicing two optical fibers comprising the steps of:
forming a splice terminal including a fiber-carrying means having therealong two laterally spaced fiber-alignment means coextending forwardly from a common fiber-receiving end of said fiber-carrying means to preselected locations adjacent focal points of a light-transition means having a reflective means forwardly thereof, said focal points and said reflective means being related such that light entering said light-transition means at one said focal point is reflected by said reflective means in a collimated and then focused beam to the other said focal point, and said splice terminal including fiber-securing means along and spaced a first distance laterally from said fiber-alignment means, said fiber-securing means joined to said fiber-carrying means in a manner permitting said fiber-securing emans to be moved laterally inwardly toward said fiber-alignment means to a second position a second distance laterally therefrom and closer thereto than said first distance;
preparing end sections of two optical fibers to be spliced including optically preparing end faces of transmission members of said fibers and removing buffer material from a predetermined stripped fiber length of each of said transmission members;
inserting each said prepared fiber end section into an end of a respective fiber-alignment means disposed on said common end of said fiber-carrying means, and urging each said end section forwardly into said fiber-alignment means until said optical end face of said fiber is adjacent an axially normal fiber-proximate surface portion of said light-transition means at a said focal point; and moving said fiber-securing means to said second position and securing it thereat, thereby and thereafter applying resilient force to secure said fiber end sections in respective said fiber-alignment means, whereby said two fiber end sections are coextensively secured in said splice terminal with optical ends faces thereof disposed at said focal points, and said optical fibers are optically connected.

42. In an optical fiber splice terminal to receive and secure therein prepared end sections of two optical fibers to optically splice the two optical fibers together, the improvement comprising an integral member including:
a fiber-carrying section extending forwardly from a fiber-receiving end and including opposing fiber-carrying surface, each of said fiber-carrying surfaces including formed therealong a V-shaped groove extending axially forwardly from said fiber-receiving end;
an optically clear light-transition section at a forward end of said fiber-carrying section having rearwardly facing surface portions normally intersecting the axes of forward ends of said V-shaped grooves at focal points; and
a fiber-remote surface at a forward end of said light-transition section including a pair of paraboloid reflective surface portions having a preselected orientation and spacing with respect to each other and to said focal points such that light emittable at one of said focal points from an optical end face of an optical fiber disposed along a respective axis of a forward end of said V-groove and secured therein, transits a first portion of said light-transition section, is received by an associated one of said paraboloid reflective surface portions, is collimated thereby and reflected toward the other of said paraboloid reflective surface portions, is focused thereby and reflected toward the other of said focal points, transits a second portion of said light-transition section and is receivable in a focused beam at said other focal point, to be received by an optical end face of another optical fiber disposed along a respective axis of a forward end of the other said V-groove and secured therein.

43. A member as set forth in claim 42 further including a transverse aperture extending from one said fiber-carrying surface to the other along said rearwardly facing surface portions of said light-transition section and intersecting and terminating said forward ends of said V-shaped grooves.

44. A member as set forth in claim 42 wherein said V-shaped grooves are profiled and each has a larger rearward groove portion associated with a buffered portion of an associated fiber end section, a smaller forward groove portion associated with a stripped end portion of said fiber end portion, and a tapered groove portion extending from said larger rearward groove portion to said smaller forward groove portic 45. A terminating system for terminating a pared end section of an optical fiber such that a transmission member of the fiber is disposed in a preselected lateral and angular orientation with respect to a reference, said system comprising:
a fiber-carrying member having a profiled V-shaped groove along a fiber-carrying surface thereof extending from a fiber-receiving face to a forward mating face, said V-shaped groove including a larger rearward portion and smaller forward portion, said larger rearward portion associated with a buffered portion of an end section of an optical fiber to be disposed therealong and said smaller forward portion associated with a stripped end portion of the transmission member of said optical fiber; and
a cover member coextensive with said fiber-carrying member having an inner fiber proximate surface, said inner surface being profiled and includes a recessed rearward portion thereof opposed from said larger rearward groove portion, and an unrecessed forward portion thereof opposed from said smaller forward groove portion; and
means to secure said cover member to said fiber-carrying member at least after a said fiber end section is disposed therbetween, such that said cover member is securable to said fiber-carrying member at least in a closed position after a said prepared end section of a said optical fiber has been disposed along said V-shaped groove with a stripped end portion along said forward groove portion and a buffered portion along said rearward groove portion, with said rearward cover surface portion compressing said buffered fiber portion against said rearward groove portion and said stripped fiber end portion against said forward groove portion, whereby said transmission member of said optical fiber is in a desired lateral orientation and in a desired angular orientation after said securing with respect to the bottom of said V-shaped groove.

46. A terminating system as set forth in claim 45 wherein said cover member is initially secured to said fiber-carrying member in a relatively open position prior to said prepared end section of said optical fiber being disposed along said V-shaped groove and said V-shaped groove includes a tapered portion intermediate said larger rearward portion and said smaller forward portion providing a transition therebetween such that the front end of said end section of said optical fiber axially inserted between said cover member and said fiber-carrying member and along said profiled V-shaped groove is guided thereby from said larger rearward groove portion into said smaller forward groove portion.

47. A terminating system as set forth in claim 46 wherein said inner surface of said cover member includes a tapered portion intermediate said recessed rearward portion and said unrecessed forward portion to cooperate with said tapered groove portion in guiding said front end of said optical fiber during insertion.

48. A terminating system as set forth in claim 47 wherein at least said fiber-carrying member has outwardly tapered lead-in surfaces at the rearward end of said profiled V-shaped groove along said fiber-receiving face thereof.

49. A terminating system as set forth in claim 45 wherein said cover member is securable within a longitudinal recess associated with said fiber-carrying surface of said fiber-carrying member and defined by side walls thereof.

50. A terminating system as set forth in claim 45 wherein said securing means comprise projections on one of outwardly facing side surfaces of said cover member inwardly facing surfaces of said side walls of said fiber-carrying member digging into the other thereof after said cover member is moved to said closed position securing said optical fiber end section.

* * * * *